Oct. 1, 1963 W. C. MEYER 3,105,882
PRESSURE TRANSDUCER TESTING CIRCUIT
Filed Aug. 29, 1962
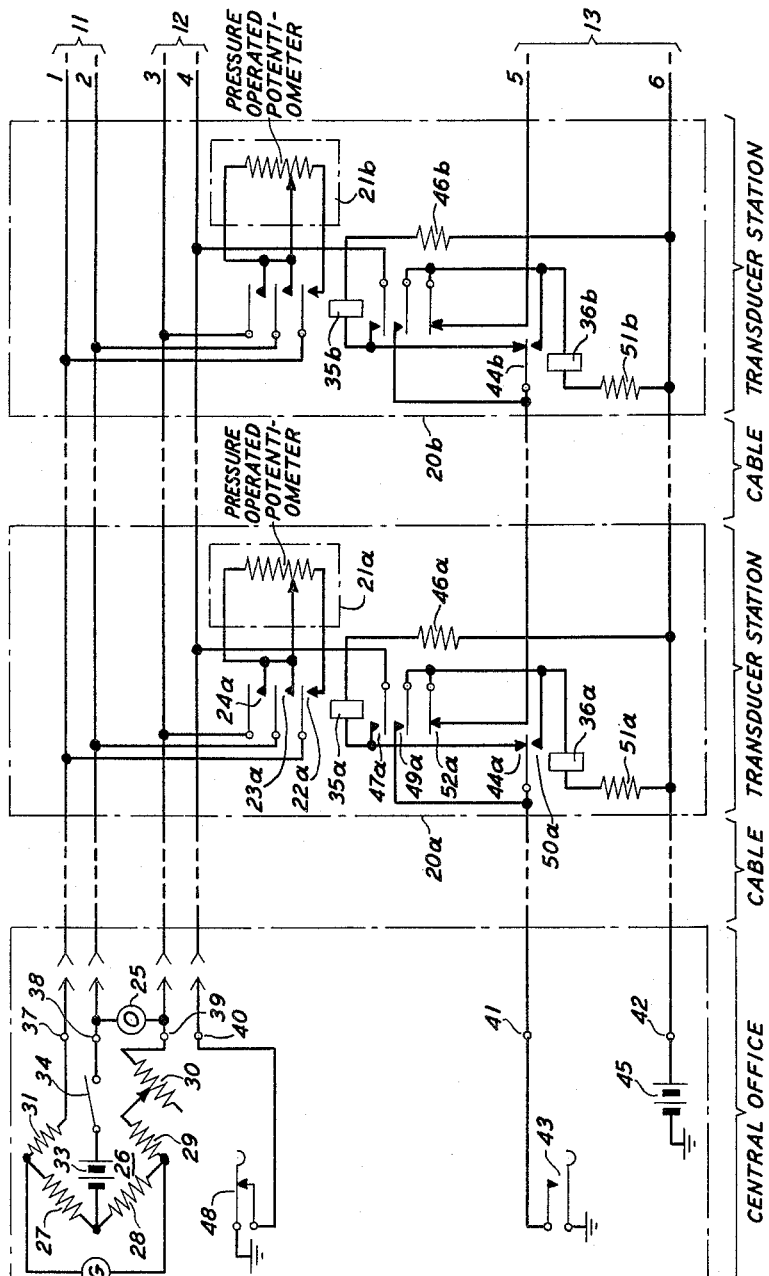
INVENTOR
W. C. MEYER
BY
G. E. Hinrich Jr.
ATTORNEY

3,105,882
PRESSURE TRANSDUCER TESTING CIRCUIT
William C. Meyer, Basking Ridge, N.J., assignor to
American Telephone and Telegraph Company, New
York, N.Y., a corporation of New York
Filed Aug. 29, 1962, Ser. No. 220,232
7 Claims. (Cl. 179—175.3)

This invention relates to testing systems and more particularly to testing systems for measuring the pressure at each of a plurality of spaced locations in a pressurized communications cable or the like.

One of the most difficult and time consuming jobs in maintaining communications cables in a pressurized atmosphere, e.g., of gas or dry air, is that of securing pressure readings at spaced points along the cable with a degree of accuracy sufficient to permit gradient plotting techniques and the like to be used to detect and locate the position of a leak or low pressure situation. On aerial cables, particularly, variations of temperature and barometric pressure encountered during the relatively long interval required for a technician to traverse rights of ways, climb poles, and the like to obtain gradient data directly from each test position along the cable, result in information that frequently is inaccurate.

To avoid many of the problems involved in locating leaks by direct pressure measurements in the field, it has become common practice therefore to ascertain the approximate location of leaks via resistance measurements conducted at a central office. By placing a pressure sensitive contactor at each of a plurality of spaced intervals in a pressurized cable, it is possible to detect the presence, and to some extent, the location of a leak. Typically, the contactors are actuated when cable pressure falls below a preassigned level, and shunt the connecting cable pair with a fixed, predetermined resistance. The resistance is then correlated with typical line resistance to identify the location of the leak. Although this technique eliminates, in large measure, the necessity for periodic field measurements, it, nevertheless, does not provide sufficient useful information for plotting accurate pressure gradients which permit a fault location to be accurately pinpointed. Further, for economy, the contactors normally are connected across the same cable pair. Consequently, there is no simple way to ascertain if more than one contactor is closed, so that an inherent ambiguity in fault location exists.

Fully automatic gradient plotting may be achieved by placing a pressure transducer at each of a number of specified cable locations and by periodically interrogating each to ascertain the momentary pressure condition at each location. While this supplies sufficient data for gradient plotting, it ordinarily requires extensive apparatus at each test location along the cable system and elaborate terminal equipment. More importantly, however, it normally requires the permanent service of several cable pairs between the terminal station and each of the several remote transducer locations. In a communications channel, a telephone pressure cable, for example, it is, of course, undesirable to tie up communication circuits permanently for test purposes.

It is the principal object of the present invention to avoid these shortcomings by securing accurate pressure gradient data electrically from measurements made solely at a central office test board. It is a further object of the invention to transmit pressure data from each of a number of remote stations to the terminal station in an economical fashion, one that does not substantially reduce the message carrying capabilities of the cable system.

In accordance with the present invention, these and other objects are fulfilled by means of a pressure testing system which utilizes a variable pressure-responsive transducer at each of a plurality of spaced test points along a pressurized cable. The instantaneous cable pressure at a given test point is translated by the transducer into resistance which is periodically measured at a common remote terminal station. Only one cable pair is permanently connected to the transduced circuits; two additional cable pairs are employed during the actual interrogation of the several transducers. Preferably, gradient data are obtained from all transducer stations in the system in a relatively short interval of time during night hours. Temperature and gas feed conditions are most stable at this time and, moreover, cable traffic is then generally the lightest. The two additional cable pairs used for the short interrogation period may be used for other services at all other times. At the terminal station a Wheatstone bridge circuit or the like is employed for measuring the momentary resistance of each transducer. These measures are indicative of the momentary pressure at each remote station and from them accurate gradients may be plotted. With a continuous gas feed, the gradient between leaks should follow a straight line. Three legs of the bridge are mounted in the test set; the fourth is mounted at each of the several transducers. It is in accordance with the invention to employ a three wire connection between the terminal bridge elements and the several transducer bridge elements so that cable conductor resistance appears in two legs of the bridge and any error due to differences in transducer location are eliminated.

The invention thus features an arrangement for sequentially connecting a resistance element adjusted as a function of pressure in each of a plurality of remote stations along the cable to a bridge circuit at the central office.

In operation, interrogation of the various remote pressure transducers is initiated at the terminal station, for example, by supplying a ground connection to one wire of the permanent cable pair. This is sufficient to initiate a semiautomatic sequence of operations which connects the resistance element of the pressure transducer at the first remote station to the terminal bridge circuit. The bridge is then balanced at the terminal station and the pressure of the first remote station noted. A momentary interruption of the ground circuit normally associated with another one of the circuits connected to the transducer actuates an automatic stepping mechanism which effects a transfer of the remote bridge arm resistance from the transducer in the first remote location to that in the second remote location. By repeating this sequence, each of the remote transducers may be read accurately and quickly. Sufficient information is thus obtained in a relatively short time to permit accurate gradients of pressure to be plotted. At any instant a check may be made on the particular transducer under interrogation merely by measuring the total loop resistance of the circuit. Prerecorded resistance data positively identifies the location of the particular transducer. It is of course possible, and in some cases may be preferable, to supply additional terminal equipment for carrying out all of the above operations in a completely automatic fashion. Such apparatus, although compatible with the present invention, forms no part thereof.

A complete understanding of the invention and of its objects and features may be gained from a consideration of the following detailed description taken in conjunction with the single accompanying drawing which depicts in diagrammatic form a testing system for measuring pressure in pressurized lines in accordance with the principles of the invention.

The single FIGURE illustrates a testing system for measuring pressures at a number of points within a cable system which extends from a local terminal location or central office to a remote terminal location. It comprises a test set, represented by the apparatus within an enclosed dash-line box 10, located at the central office, and a number of transducer stations 20a, 20b, . . . 20n placed along the length of the cable at suitable intervals, for example, at intervals of six to ten thousand feet. The several transducer stations 20 are connected to the central office test set 10 by three cable pairs 11, 12, and 13. Cable pairs 11 and 12, which include lines 1, 2 and 3, 4, respectively, may be connected to test apparatus 10 via suitable patch connectors or the like whenever it is desired to obtain pressure readings at the remote transducer stations. Cable pair 13, which includes wires 5, 6 is permanently associated with the transducer station, that is, since it is connected to the transducer station in a fashion that makes it unsuitable for ordinary communication purposes, it preferably is tied permanently to test set 10.

Each transducer station 20 includes a variable pressure responsive transducer 21a, 21b, . . . 21n each preferably with a resistance of ten thousand ohms. Suitable transducers are commercially available. They generally include a diaphragm and suitable means for altering the slider arm of a potentiometer or the like. Three connections to the resistance element of each transducer, i.e., the terminal connections and the slider arm, may be connected via terminals 22, 23, and 24 of relay 35 to cable wires 1, 2, and 3. Thus, when relay 35 is actuated in any one of the transducer stations (it is not actuated in more than one station at a time), the resistance element of transducer 21 is connected by lines 1, 2, and 3 to a bridge circuit 26 in test set 10 where it completes the bridge by forming one of its arms.

The bridge circuit, which preferably is of the Wheatstone variety, includes two ratio arms 27 and 28 and a variable arm which includes resistor 29 and potentiometer 30. Ratio arms 27 and 28 preferably are ten thousand ohm resistors and the variable arm includes a fixed five thousand ohm resistor 29 and a tenthousand ohm variable resistor 30. A five thousand ohm resistor 31 is included in the remaining leg of the bridge. A null indicating device such as a galvanometer 32 is connected between the junctions of resistors 27 and 31 and resistors 28 and 29, and a source of energizing potential, e.g., battery 33, is connected between the junctions of resistors 27 and 28 and via switch 34 to terminal 38. It will be observed that an impedance element connected between terminals 37 and 38 completes the bridge circuit. As will be described below, the several transducer resistors are connected, in turn, to these terminals.

Terminal 39, to which one end of potentiometer 30 is connected, is tied to terminal 38 by way of that one of the transducer stations that momentarily is connected to the test set. By employing a three wire connection to the remote leg of the bridge, the cable conductor resistance, that is, the resistance of the cable between the bridge and the particular resistance in the transducer station which forms the fourth leg of the bridge, appears in two legs of the bridge and is balanced out. It thus eliminates possible error caused by the variations in distance between the several transducer stations. Accordingly, when relay 35a in transducer 20a is actuated, for example, resistor 21a is connected to bridge terminals 37 and 38 via wires 1 and 2 to form the fourth leg of bridge 26, and terminals 38 and 39 are connected together via wires 2 and 3 and contacts 23a and 24a of relay 35a.

When the bridge circuit is completed, e.g., when resistor 21a is connected between terminals 37 and 38 and terminals 38 and 39 are connected together, switch 34 is closed to activate it. By adjusting the value of potentiometer 30 a null may then be obtained on galvanometer 32 to indicate bridge balance. At balance, the resistance of potentiometer 30 exactly equals that of the pressure transducer. (Resistors 29 and 31 in corresponding ratio arms do not affect balance, they are a normal part of a standard bridge circuit used also for other purposes. They may be eliminated from both arms if desired.)

Accordingly, potentiometer 30 may be directly calibrated in pressure units. It has been found that an operating range of about 7 p.s.i. is quite satisfactory for use with pressure cables in aerial systems. Potentiometer 30 may therefore be calibrated to read p.s.i. in the range of 0 to 10 p.s.i., for example. If desired, it may, of course, be calibrated directly in resistance or in any arbitrary system of measure, and suitable correlation data used to convert to pressure values.

In accordance with the invention, the transducer resistance elements 21 in each of the transducer stations are connected in turn to the bridge 26 at the test set 10. To insure that only one transducer at a time is so connected and further to provide a semiautomatic arrangement for permitting the several readings to be made quickly and efficiently from the central office test set, each transducer station includes, in addition to the transducer 21, two relays 35 and 36. Their operation may best be understood from a consideration of a typical operating sequence.

When it is desired to interrogate the several transducers to ascertain the momentary pressure situation at each station, switch 43 at test set 10 is closed and locked to place a ground on wire 5. The ground connection is transferred via the normally closed contact 44a of relay 36a to one side of relay 35a at transducer station 20a. The other energizing terminal of relay 35a is connected to the test station battery 45 via current limiting resistor 46a and wire 6; wire 6 being permanently connected via terminal 42 to battery 45. This operates relay 35a which then locks in the operating position by means of a (semi-) permanent ground affixed to one side of relay 35a by way of contact 47a and wire 4. Wire 4 is connected via terminal 40 at test station 10 to ground through normally closed switch 48. In addition, the operation of relay 35a places the ground connection at switch 43 on one side of the operating coil of relay 36a through wire 5 and contact 49a of relay 35a. The other terminal of relay 36a is connected via current limiting resistor 51a and wire 6 to the office battery 45. This operates relay 36a which is then locked in operating position by virtue of the ground connection supplied to it from wire 5 through holding contacts 49a of relay 35a and 50a of relay 36a. Operation of relay 35a also connects the two ends and the slider arm of pressure operated potentiometer 21a to wires 1, 2, and 3 as described above via contacts 22a, 23a, and 24a.

Resistors 46 and 51 provide current limiting, and have different values for different field locations. They are selected to provide the minimum current required to operate the relays at each location. Correct values are desirable, both to avoid high relay currents and to limit line drops; otherwise only a few stations could be connected to the system before line drops would starve the relays in more remotely located stations and produce false operation.

Bridge 26 is then balanced by adjusting potentiometer 30 to match the resistance of transducer 21a. Balance is indicated by a null on meter 32. Although the single potentiometer shown in the drawing provides a suitable indication of transducer resistance, vernier arrangements or the like, well known to those skilled in the art, may be used to insure precise measurements. Calibration in terms of pressure may be made using any desired technique; a simple resistance versus pressure calibration curve is satisfactory.

Upon completion of the measurement of the momentary value of the resistance of potentiometer 21a, switch 48 is momentarily operated to remove ground from wire 4. This removes ground from the holding winding of relay 35a in transducer station 20a so that it is permitted to return to its nonoperate position. When relay 35a is in a nonoperate position, contact 52a is closed, which transfers the ground from that portion of wire 5 which extends from station 20a to test set 10 and contact 50a of relay 36a, to that portion of wire 5 which extends to test station 20b; i.e., the ground of terminal 41 at test set 10 now bypasses station 20a and extends to station 20b. This action closes relay 35b at station 20b. Thereafter the sequence outlined above is repeated at station 20b and, as soon as the bridge measurement of resistor 21b has been completed, switch 48 is momentarily actuated to remove resistance 21b from the bridge circuit and transfer operation to the next substation. This continues until resistor 21n at transducer station 20n is finally connected to the bridge circuit.

Relays 36a–36n at each of the transducer stations remain in the operated position as the sequence of interrogation progresses. When the sequence of testing is completed, however, switch 43 at test set 10 is opened to remove the ground connection from wire 5. This releases all of the operated relays 36. The battery connection, grounds, and bridge connections may then be removed from the cable system, by opening the patch connections, and restored to normal use.

If during any of the individual bridge measurements a doubt arises as to the particular transducer under interrogation an additional measurement may be made. It should be pointed out, however, that this is an unlikely situation since the several transducer stations are interrogated in order and it is only necessary to keep a record of the bridge measurements as they are made to know precisely which station is being interrogated. Nevertheless, provision is made for individual loop resistance measurements to identify positively any transducer station. This may be done simply by measuring the resistance of the loop formed by wires 2 and 3 by means, for example, of an ohmmeter 25, or by using the bridge as outlined above. A record of typical loop resistance for each transducer station 20 may be recorded permanently to provide a reference.

The individual transducer station apparatus 20, including the pressure sensitive transducer 21 and the associated relays, may be located conveniently in a splice sleeve or the like at spaced points along the length of the cable with the pressure sensitive faces of the transducers positioned within or proximate to a point in the pressurized cable system.

The above-described arrangements, are, of course, merely illustrative of the application of the principles of the invention. Numerous other arrangements may be devised by those skilled in the art without departing from the spirit and scope of the invention.

What is claimed is:

1. Apparatus for measuring the pressure at a plurality of points spaced along a pressurized cable system comprising a central office test station and a plurality of transducer stations, said transducer stations being spaced at prescribed intervals along the length of said cable, means in each of said transducer stations for converting the momentary pressure in said cable into a corresponding resistance value, a bridge circuit located in said central office station provided with first and second matched ratio arms, a third variable resistance ratio arm, means for indicating bridge balance, and potential means for energizing said bridge, and means for progressively and successively connecting the resistance elements of said transducer stations individually to said bridge circuit for use as the fourth ratio arm of said bridge.

2. In a telephone system, a central office including a test station, a plurality of line pairs extending from said central office in a pressurized cable, and means for measuring the pressure within said cable at a number of prescribed points along its length, said pressure measuring means comprising a transducer positioned within said cable at each of said prescribed locations for converting pressure to resistance, signal responsive means at each of said locations for selectively connecting said transducers across one of said line pairs, means for supplying signals from said test station to each of said transducers via other ones of said line pairs in order sequentially and progressively to actuate said signal responsive means at each of said locations, and means at said test station for individually measuring the resistance of the pressure transducer that at any instant is connected across said one line pair.

3. Apparatus for measuring the pressure at a plurality of points spaced along a pressurized cable system comprising a central office test station and a plurality of transducer stations, said transducer stations being spaced at prescribed intervals along the length of said cable, means in each of said transducer stations for converting the momentary pressure in said cable into a corresponding value of resistance, a bridge circuit located in said test station provided with first and second matched ratio arms, a third variable resistance ratio arm, terminal means in the fourth ratio arm, means for indicating bridge balance, and potential means for energizing said bridge, six signal lines extending from said test station to said several transducer stations, signal actuated switching means positioned in each of said transducer stations, means responsive to said switching means for connecting the transducer resistance of said station across two of said lines, means for connecting said two lines to said terminal means in said fourth bridge ratio arm at said test station, and means at said test station for supplying signals via three of said wires to actuate progressively and successively said switching means in each of said transducer stations, thus to connect each of said transducer resistances in turn to said bridge terminal means whereby said resistances act as the fourth ratio arm of said test station bridge.

4. Apparatus for measuring the pressure at a plurality of points spaced along a pressurized cable system as defined in claim 3 wherein said third variable resistance ratio arm of said bridge is connected to one of the terminal means in the fourth ratio arm by way of a circuit completed through one of said lines connecting said fourth ratio arm terminal means to said transducer resistance and another line extending from said test station to said transducer station whereby the resistance of said line connecting said test station to said transducer station appears both in said third and said fourth ratio arms of said bridge.

5. Apparatus for measuring the pressure at a plurality of points spaced along a pressurized cable system as defined in claim 4 which includes means at said central office test station connected across said lines which connect said third ratio arm to said fourth ratio arm for measuring the resistance of the loop formed by said pair of wires which extend between said test station and said transducer stations.

6. Apparatus for measuring the pressure at a plurality of points spaced along a pressurized cable system as defined in claim 3 wherein said switching means positioned in each of said transducer stations comprises a pair of multicontact relays energized by signals supplied from said test station.

7. In a telephone system, a central office including a test station, a plurality of lines extending from said central office in a pressurized cable, and means for measuring the pressure within said cable at a number of prescribed points along its length, said pressure measuring means comprising a transducer positioned within said cable at each of said prescribed locations for converting pressure to resistance, signal responsive means at each of said transducer locations for selectively connecting said transducers across a pair of said lines, means at said test station for individually measuring the resistance of the pressure transducer connected across said pair of lines, means for supplying a first signal from said test station to the first of said transducers located at the prescribed point nearest said test station via other ones of said lines for actuating said signal responsive means thereby to connect the resistance of said first transducer across said pair of lines, means for supplying a second signal from said test station to said first transducer location to disconnect said transducer from said pair of lines and for supplying a signal to the second transducer station at the next of said prescribed points there to actuate said signal responsive means in order that the resistance of the transducer at said second prescribed point may be measured at said test station, and means for progressively and successively supplying said second signal from said test station to said signal responsive means at said second prescribed point and to the signal responsive means at each remaining one of said prescribed locations.

No references cited.